(12) United States Patent
Dunford

(10) Patent No.: US 6,685,014 B1
(45) Date of Patent: Feb. 3, 2004

(54) DISK STORAGE AND HANDLING MAGAZINE

(75) Inventor: William W. A. Dunford, Boulder, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 415 days.

(21) Appl. No.: 09/675,572

(22) Filed: Sep. 29, 2000

(51) Int. Cl.[7] ............................................. B65D 85/02
(52) U.S. Cl. ................. 206/303; 206/308.1; 211/41.12
(58) Field of Search .............................. 206/308.1, 309, 206/310–312, 307, 307.1, 303, 493, 499, 593; 211/41.12, 186–188; 414/796.7, 796.8, 796.9, 908

(56) References Cited

U.S. PATENT DOCUMENTS

| | | | | |
|---|---|---|---|---|
| 4,282,973 A | * | 8/1981 | Binkowski | 206/308.3 |
| 4,285,016 A | * | 8/1981 | Gilovich | 360/84 |
| 4,434,891 A | | 3/1984 | Skinner et al. | |
| 4,516,678 A | * | 5/1985 | Fotiadis et al. | 206/308.3 |
| 4,523,885 A | | 6/1985 | Bayne et al. | |
| 4,536,083 A | | 8/1985 | Lüscher | |
| 4,552,285 A | | 11/1985 | Lüscher | |
| 4,577,756 A | * | 3/1986 | Hennessy et al. | 206/308.3 |
| 4,700,839 A | * | 10/1987 | Fujii | 206/308.3 |
| 4,955,471 A | * | 9/1990 | Hirose et al. | 206/303 |
| 6,112,894 A | * | 9/2000 | Kikuchi et al. | 206/308.1 |
| 6,116,416 A | | 9/2000 | Hansen et al. | |
| 6,296,114 B1 | * | 10/2001 | Bubb et al. | 206/308.1 |
| 6,435,343 B1 | * | 8/2002 | Wu et al. | 206/308.1 |
| D463,277 S | * | 9/2002 | Yang | D9/428 |

* cited by examiner

Primary Examiner—Shian Luong
(74) Attorney, Agent, or Firm—MacPherson Kwok Chen & Heid LLP

(57) ABSTRACT

A disk storage and handling magazine has a spindle mounted on a bottom cap. Disks are loaded in the magazine by passing the spindle through a hole in the center of the disks. The disks may be separated by spacers to prevent the disks from touching each other. In some embodiments, the magazine includes a tube surrounding the spindle and a removable top cap fitting over the spindle and the tube. The magazine also includes a jacking mechanism that moves up and down the spindle for automatically unloading disks from the magazine. The jacking mechanism has a jacking plate mounted on at least one plug. The at least one plug seats in a hole in the bottom cap of the magazine to form an airtight seal when the jacking mechanism is at the bottom of the spindle.

12 Claims, 5 Drawing Sheets

DISK STORAGE AND HANDLING MAGAZINE

BACKGROUND

Much data stored in digital form is stored on optical disks, such as audio compact disks or CD ROMs. In the case of software or music or the like stored on an optical disk, the data is mastered on the disk, i.e., the data is provided on the disk prior to the disk reaching the ultimate user of the data. Two examples of mastering are stamping or pressing vinyl audio recordings or injection molding compact disks or CD ROMs. Typically, a mastered software program CD-ROM or a mastered audio compact disk is produced in large quantities for wide distribution. Thus, the mastering process requires handling a large quantity of disks. Similarly, disks with data storage that is writeable by the user, such as writeable CD-ROMs or floppy disks, are also typically produced in large quantities.

Debris or electrostatic energy resulting from handling such disks can harm the integrity of the data mastered onto the disk or the writeable area of the disk. Accordingly, during mastering or manufacture, large quantities of disks must be handled in a way to reduce exposure of the disks to debris and electrostatic energy generated by mastering or manufacturing machinery. Furthermore, the disks can only be handled by the portion of the disk that does not contain mastered data or a storage area, to protect the mastered or data storage area of the disk from scratches that may impair the ability of the ultimate user to retrieve the mastered data from the disk or to store data on the disk. In the case of an audio compact disk or CD-ROM, the disk may only be handled by the inner diameter of the disk, where no data are stored.

SUMMARY

In accordance with the invention, a magazine for handling disks is disclosed. The magazine includes a bottom cap with a spindle mounted on the bottom cap. The disks are stored by passing the spindle through a hole in the center of the disks to stack the disks on the spindle. In one embodiment, the disks are separated by spacers so that the mastered portions of the disks do not contact each other when the disks are stored on the spindle. In other embodiments, the magazine includes a tube surrounding the spindle and the disks for protecting the disks from debris. The magazine also includes a removable top cap which is removed to load and unload the magazine. In some embodiments, the magazine includes a jacking plate assembly for automatic insertion and extraction of disks into the magazine.

Magazines according to embodiments of the present invention offer several advantages. First, disks may be automatically inserted and extracted from the magazine. In addition, the magazine may be a manageable size for humans to handle in order to transport disks from one location to another during manufacture and subsequent assembly. Also, the magazine may be made out of material such that the magazine is simple to clean. The magazine allows disks to be transported and handled during manufacture such that the only contact made with this disk is at the hole in the center of the disk. The portion of the disk adjacent to this hole is eventually covered by a hub glued on the disk, thus there is no mastered data stored adjacent to the hole in the center. Handling disks in such away protects the part of the disk containing mastered data from damage. The magazine may be inexpensive to manufacture and the materials minimize the occurrence of electrostatic discharge that may build up on the disks during handling. Finally, in some embodiments, the magazine is fabricated from materials that are transparent so that a person or machine can count the number of disks stored in the magazine.

DETAILED DESCRIPTION

An optical disk containing mastered data is manufactured in several steps. First, the disk is formed by injection molding polycarbonate using a template including the mastered information. The molded disks are then sputter coated with a reflective alloy and a protective layer. Once the disks are molded and sputtered, a hub may be glued on the center of the disk for handling by the device that reads the disk, the disks are typically assembled into cartridges, and then the cartridges are packaged for distribution. The present invention provides a magazine for storing and transporting disks after they have been molded and sputtered and before the hub in the center has been glued on. A magazine according to an embodiment of the present invention is useful to protect disks that have been molded and sputtered during transportation for example from a facility that molds and sputters the disks to a facility that glues hubs on the disks and packages the disks.

Figure 1:
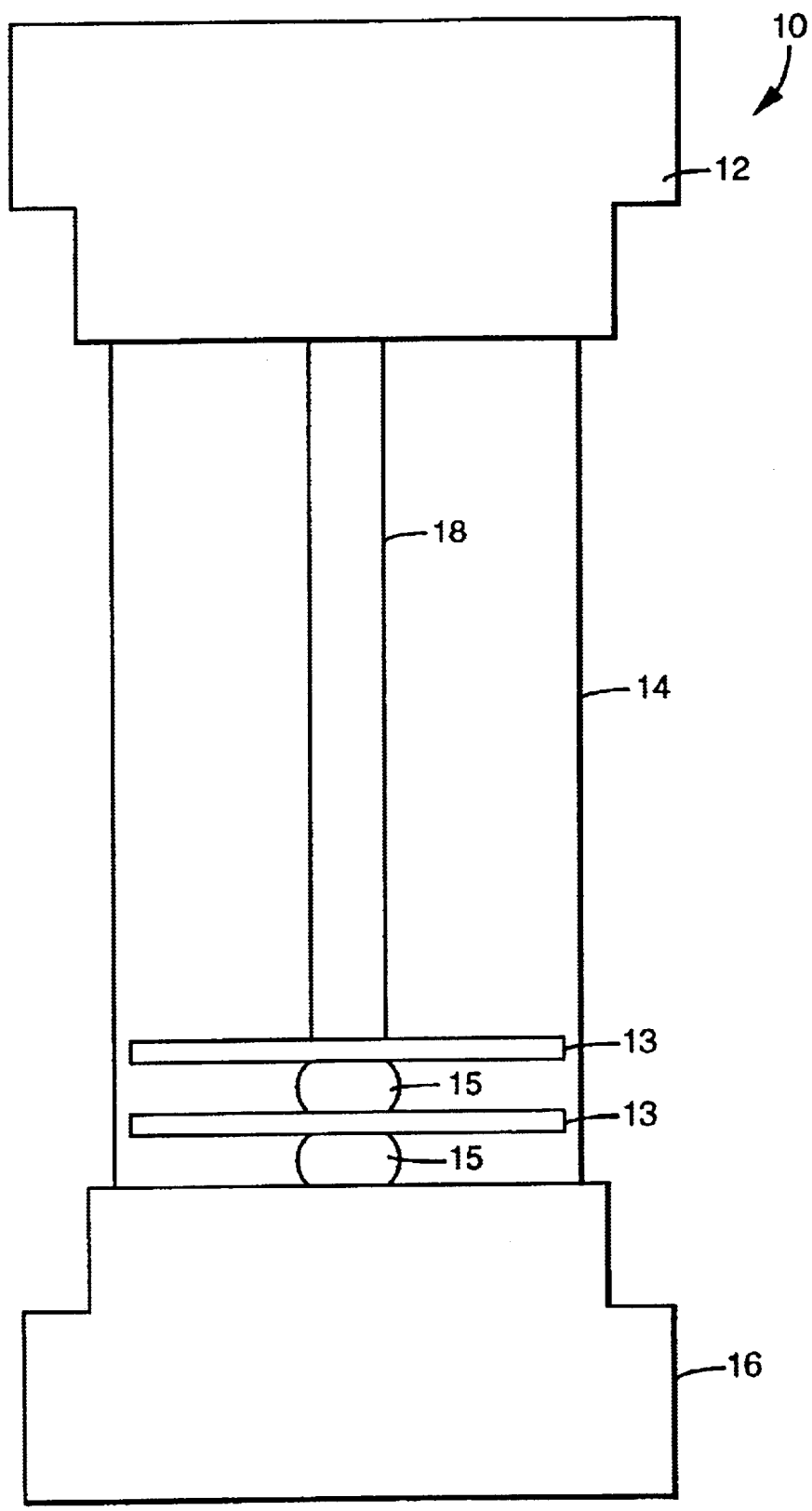
FIG. 1 illustrates a side view of one embodiment of a media magazine.

FIG. 1 illustrates one embodiment of a media magazine according to the present invention. FIGS. 1–4 are not drawn to scale. Media magazine 10 includes a bottom cap 16 with a spindle 18 attached to the bottom cap 16. Spindle 18 is sized to accommodate the holes in the center of the disks to be stored on spindle 18. In one embodiment, spindle 18 is less than 4 mm in diameter to accommodate a disk with a center hole which is 4 mm in diameter. Spindle 18 is fabricated from a material that does not shed particles when disks are loaded or unloaded onto spindle 18. In one embodiment, spindle 18 is fabricated from stainless steel.

Media magazine 10 also includes a tube 14 surrounding spindle 18 and attached to bottom cap 16. Tube 14 may be attached to bottom cap 16 by screw threads, press fitting or any other suitable fastening technique. In one embodiment, tube 14 is transparent so that a person or a machine can count the number of disks stored in media magazine 10. The outside of tube 14 may also be marked with a count index to indicate the number of disks stored in the media magazine 10. For example, the outside of tube 14 may be marked with hash marks that indicate the height of a stack of ten disks. Such hash marks allow a person to quickly estimate the number of disks stored in media magazine 10.

Media magazine 10 also includes a removable top cap 12 which may be removed for loading and unloading the media magazine. Top cap 12 may form an airtight seal when fitted over tube 14 and spindle 18. Top cap 12 and bottom cap 16 may be of any shape. In some embodiments, top cap 12 and bottom cap 16 have at least one flat side to prevent rolling in the event that media magazine 10 is stored on its side. In one embodiment, top cap 12 and bottom cap 16 are hexagonal. In some embodiments top cap 12, bottom cap 16, spindle 18, and tube 14 are manufactured out of materials such as plastics that minimize electrostatic discharge between the materials and the disks or spacers stored in media magazine 10.

To store disks in media magazine 10, the top cap 12 and tube 14 are removed, allowing spindle 18 to be passed through holes in the center of disks 13 and spacers 15. In some embodiments, disks 13 are alternated with spacers 15 to prevent the mastered parts of disks 13 from touching each other when stored on spindle 18. In such embodiments, the portion of spacer 15 that contacts disk 13 is smaller in diameter than the hub that is eventually glued in the center of disk 13. The portion of the disk covered by the hub does not accommodate data storage or mastered data, thus the spacer never contacts any portion of disk used for data storage or containing mastered data. Accordingly, the mastered data on the disk or the portion of the disk used for data storage is protected from damage because that portion of the disk never contacts a spacer or another disk. In one embodiment, media magazine 10 is sized to accommodate disks that are 32 mm in diameter with a 4 mm center hole. In one embodiment, media magazine 10 is long enough to accommodate 102 disks separated by spacers.

Figure 5A:
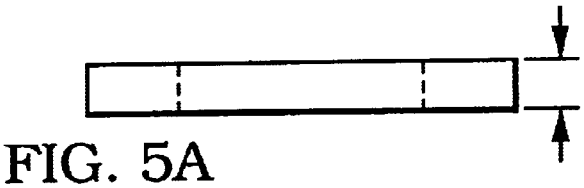
FIGS. 5A and 5B illustrate cross-sectional and top views, respectively, of a spacer.
Figure 5B:
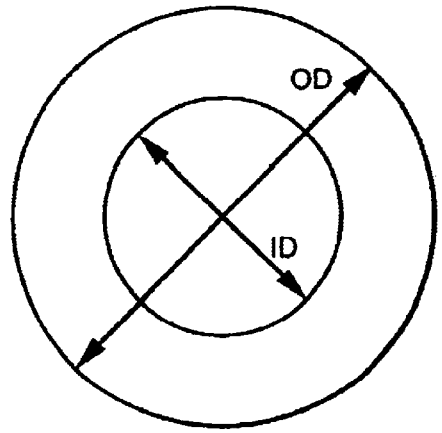

In some embodiments, spacers 15 are magnetically attractive. In one embodiment, shown in FIGS. 5A and 5B, spacers 15 are in the form of 400 series stainless steel rings having an inside diameter (ID) of 4 mm and an outside diameter (OD) of 7 mm, and a thickness (X) of 1 mm. To avoid contact between the spacers 15 and the data areas on a disk, the OD of the spacers is less than the ID of the data area on the disks. Alternatively, spacers 15 could be made from stainless steel coated with plastic.

Figure 2:
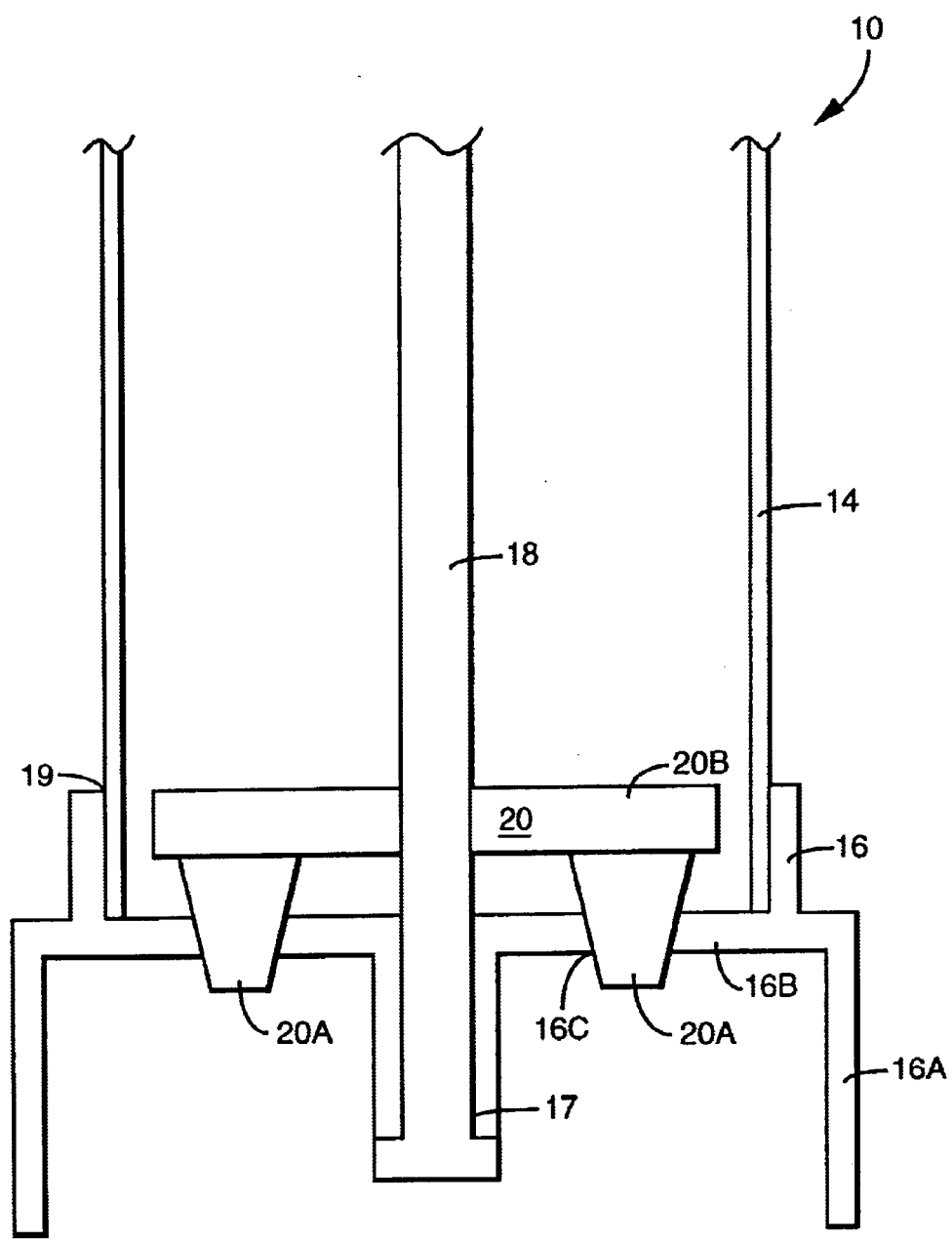
FIG. 2 illustrates a cutaway view of a lower half of the media magazine of FIG. 1.

FIG. 2 illustrates the bottom portion of media magazine 10 of FIG. 1 in more detail. FIG. 2 shows a jacking plate assembly 20 which includes a jacking plate 20B mounted on at least two plugs 20A. Jacking plate assembly 20 is used to automatically unload disks from magazine 10. Jacking plate assembly 20 moves freely up and down spindle 18. Jacking plate 20B may be a disk with a hole in the middle to accommodate spindle 18.

Bottom cap 16 includes a bottom 16B and a support structure 16A. Bottom 16B has at least one hole 16C for accommodating plugs 20A. In one embodiment there are three plugs 20A. Thus, when jacking plate assembly is at the bottom of media magazine 10, plugs 20A seat in holes 16C to form an airtight seal to protect the disks when a full magazine is transported. Spindle 18 may be permanently mounted in bottom cap 16 with an adhesive or other fastener in joint 17. In one embodiment, support 16A has a notch cut into it for aligning the media magazine with an alignment key of a media magazine bay in automatic loading and unloading machinery.

In one embodiment, spindle 18 has a round cross section to accommodate the inner hole of disks 13. In other embodiments, spindle 18 has a cross section that is partly round and partly flat. In such embodiments, a center hole of jacking plate 20B has a similar profile such that jacking plate assembly 20 remains aligned with spindle 18 as jacking plate assembly 20 moves up and down spindle 18 to load and unload disks and spacers.

To load media magazine 10, first top cap 12 and tube 14 are removed. Jacking plate assembly 20 is then moved all the way to the bottom of media magazine 10 such that plugs 20A seat in holes 16C in bottom cap 16. Jacking plate assembly 20 may be moved to the bottom of media magazine 10 by gravity, by a person manually pushing jacking plate assembly 20, or by an automatic magazine loader pushing jacking plate assembly 20. The spindle is then passed through a hole in a spacer. The spacer is placed on the spindle either by a person or by an automatic magazine loader, and allowed to fall by gravity or pushed to the bottom of spindle 18 to rest on jacking plate 20B. A disk is then inserted by aligning the center hole of the disk with the spindle then allowing the disk to fall by gravity or pushing the disk by the center until the disk rests on the spacer. Spacers and disks are then inserted alternately until media magazine 10 is full. Tube 14 and top cap 12 may then be replaced, either by a person or by automated machinery.

In one embodiment, media magazine 10 is loaded automatically by a robot arm. The robot arm includes an end effector with a electromagnetic chuck for loading spacers and vacuum grabber for loading disks. First the magnetic chuck grabs a magnetic spacer from a stack of spacers. The robot arm aligns the hole in the spacer over the spindle, then the magnet switches off such that the spacer falls to the bottom of the media magazine and rests on the jacking plate. The vacuum grabber then grabs a disk, for example from the end of an assembly line after the disk is sputtered. The robot arm aligns the hole in the disk over the spindle, then discontinues the vacuum such that the disk falls until it comes to rest on the spacer. The media magazine can be automatically unloaded in a similar fashion. First, a spacer is presented from the magazine by moving the jacking plate as described below in reference to FIG. 3. The robot arm moves in position to grab the spacer, then electromagnet switches on to grab the spacer. The robot arm moves the spacer over a bucket or other collection means and switches off the magnet so the spacer falls in the bucket. The jacking plate then moves up to present a disk. The vacuum grabber of the robot arm moves in position over the disk and switches on the vacuum to grab the disk. The disk is then positioned for example on an assembly line for packaging and the vacuum is switched off to release the disk.

Figure 3:
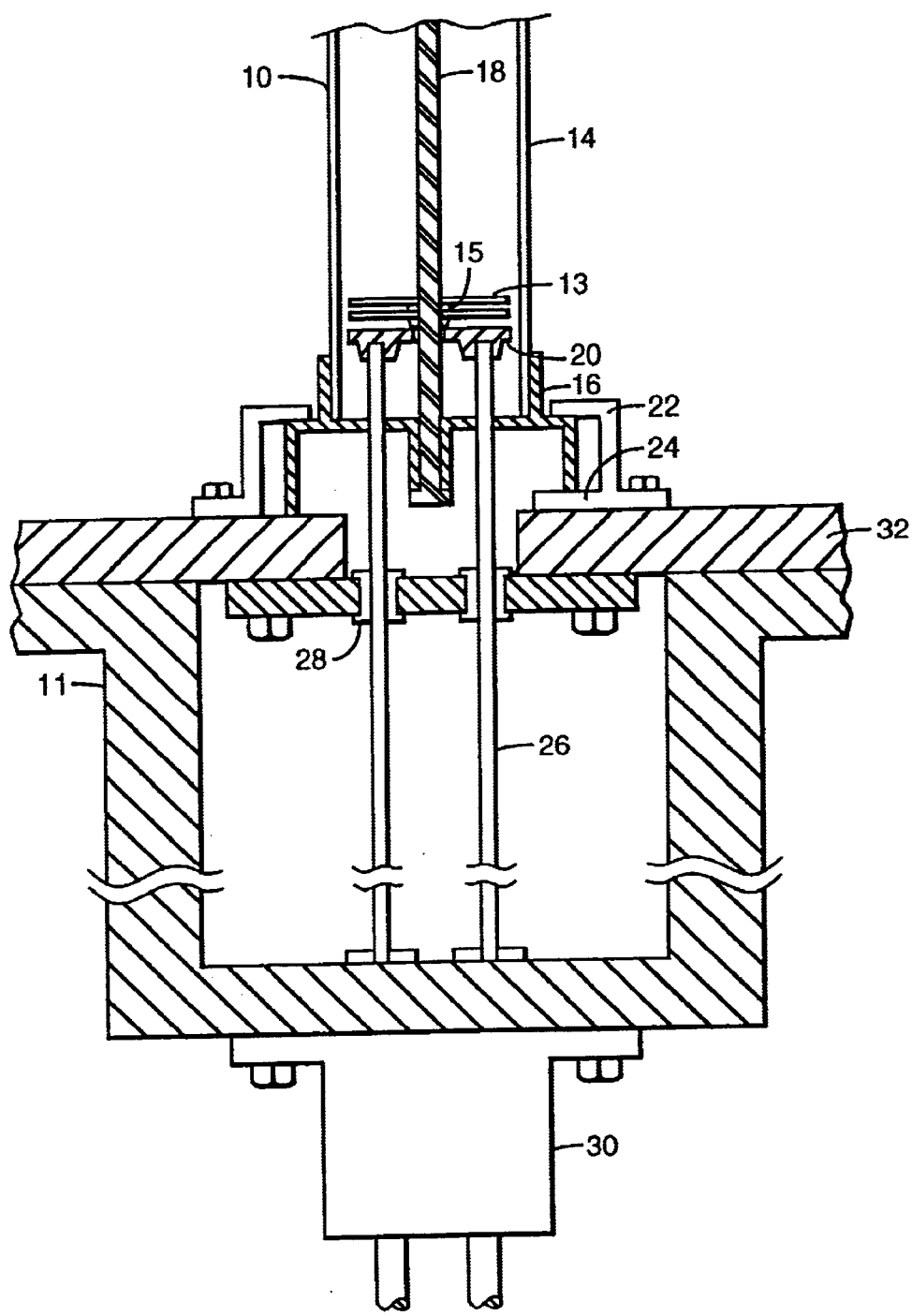
FIG. 3 illustrates a media magazine loaded on an automatic unloader.

FIG. 3 illustrates media magazine 10 loaded on an automatic handling mechanism 11. Handling mechanism 11 includes a magazine socket 22 for seating bottom cap 16 of media magazine 10. Automated handling mechanism 11 also includes an alignment key 24 for fitting in a notch cut in support structure 16A of FIG. 2 for aligning the media magazine with the automated handling mechanism. Push rods 26 fit in the bottom of plugs 20A for moving jacking plate assembly 20 up and down spindle 18. Push rods 26 are guided by guide bushing 28. Push rods 26 are attached to stepper motor 30. Stepper motor 30 raises push rods 26 one disk width at 10 a time such that automated handling mechanism 11 presents one disk at a time to other automated disk handling machinery (not shown). Thus, push rods 26 push jacking plate assembly 20 up along spindle 18, raising the stack of disks 13 and spacers 15. In some embodiments, jacking plate assembly 20 is used to load as well as unload disks. In such embodiments, a spacer is loaded, then the jacking plate is moved down, then a disk is loaded, and the jacking plate is again moved down.

Figure 6:
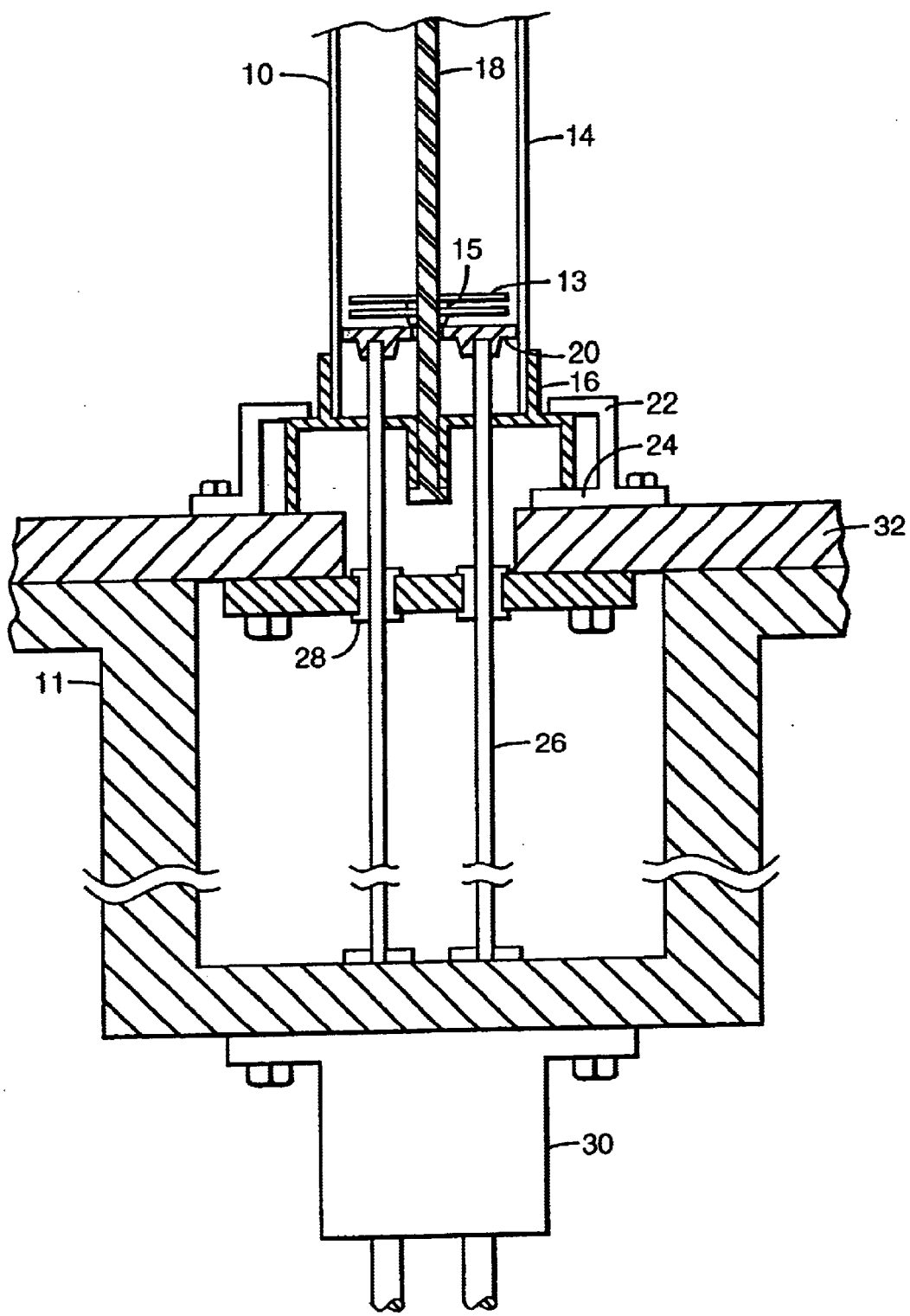
FIG. 6 illustrates a cutway view of a lower half of the media magazine in accordance with an embodiment of the present invention.

In one embodiment as shown in FIG. 6, jacking plate assembly 20 may rest against tube 14 to form an airtight seal with tube wall 14 in order to prevent grime or debris from automated handling mechanism 11 or stepper motor 30 from fouling the disks stored on spindle 18 of media magazine 10 even jacking plate assembly 20 moves along spindle 18.

Figure 4:
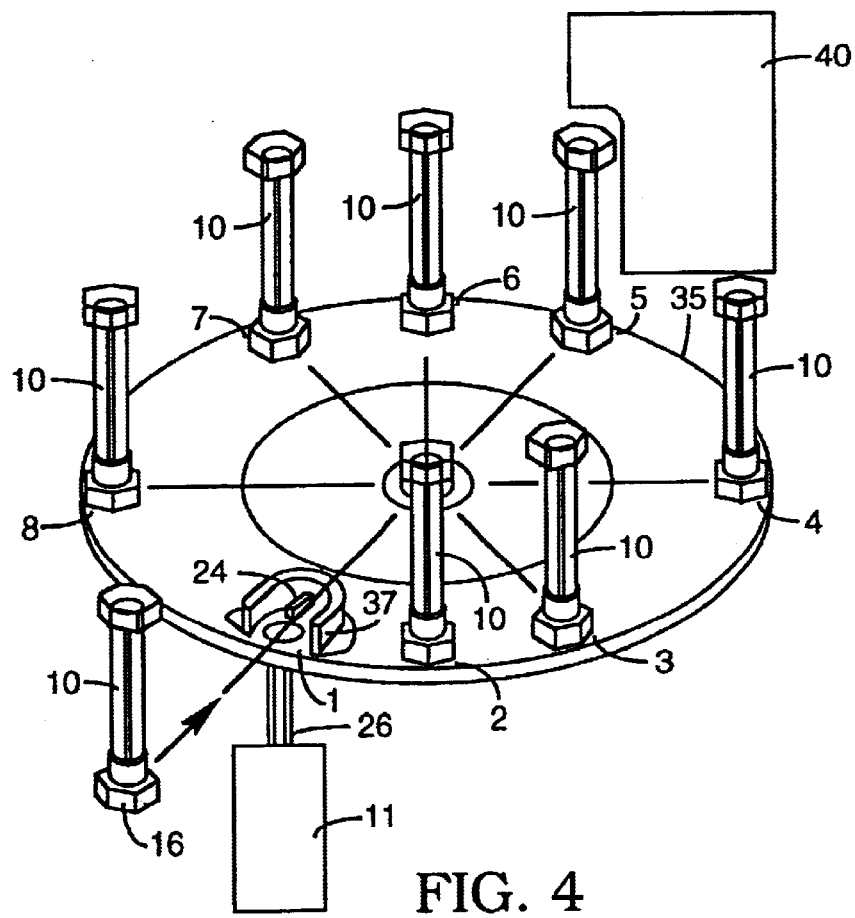
FIG. 4 illustrates a carousel for loading and unloading media magazines according to the present invention.

FIG. 4 illustrates a carousel 35 for automatically loading and unloading media magazines 10. Carousel 35 includes 8 media magazine storage stations 1 through 8. At a given time during mastering or disk production, one media magazine storage station, such as storage station 1, is located at automated unloading mechanism 11, while an opposite media magazine storage station, such as location 5, is located at automated loading mechanism 40. Automated unloading mechanism 11 unloads disks from media magazine 10 located at station 1 at the same rate that automated loading mechanism 40 loads disks into media magazine 10 at station 5 such that, at the same time a media magazine 10 at station 5 is finished loading, the media magazine 10 at station 1 is finished unloading. At this time, carousel 35 advances one media magazine storage station such that the next full media magazine, in this example of media magazine 10 located at station 8, is advanced to automated unloading mechanism 11, while the next empty media magazine, in this example the media magazine stored at station 4, is moved to automatic loading mechanism 40. In some embodiments, an automatic loading mechanism loads two magazines at a time. In some embodiments, the magazines on the carousel are loaded, then removed from the carousel by a person for transport and storage instead of automatically unloaded on the other side of the carousel.

Media magazines 10 are loaded onto media magazines storage stations 1 by aligning alignment key 24 with a notch cut in support structure 16A (FIG. 2) of bottom cap 16. Media magazines 10 therefore do not need to be permanently mounted on carousel and can thus be removed from carousel 35 for cleaning or repair.

Various modifications and adaptations of the embodiments and implementations described herein are encompassed by the attached claims. The invention is not limited to the embodiments described herein. For example, media magazine 10 can be used for any type of disk, not simply an optical disk. Also, media magazine 10 is not limited to storage and handling of disks for data storage or disks containing mastered data. Further, the invention is not limited to the materials described herein. The invention is set forth in the following claims.

What is claimed is:

1. A magazine for storing a plurality disks, the magazine comprising:

a bottom cap with at least one hole;

a spindle attached to the bottom cap; and a jacking mechanism mounted on the spindle such that the jacking mechanism moves up and down the spindle, the jacking mechanism further comprises a jacking plate mounted on at least one plug, such that when the jacking mechanism is at an end of the spindle attached to the bottom cap, the at least one plug fills the at least one hole to form an airtight seal.

2. The magazine of claim 1 wherein the bottom cap has a cross section comprising a straight edge.

3. A magazine of claim 1 wherein:

the spindle has a cross section comprising a straight edge; and jacking mechanism comprises a jacking plate with a hole in the center, wherein the hole in the jacking plate has a shape similar to the cross section of the spindle.

4. The magazine of claim 1 further comprising:

a removeable tube surrounding the spindle; and a removeable top configured to fit over a top end of the tube.

5. A magazine of claim 4 wherein the tube comprises a transparent material.

6. The magazine of claim 4 wherein the jacking mechanism contacts the tube to form an airtight seal.

7. A magazine for storing a plurality disks, the magazine comprising:

a bottom cap with at least one hole;

a spindle attached to the bottom cap;

a jacking mechanism mounted on the spindle such that the jacking mechanism moves up and down the spindle; and a notch in the bottom cap for aligning the magazine.

8. The magazine of claim 7 further comprising:

a removeable tube surrounding the spindle; and a removeable top cap configured to fit over a top end of the tube.

9. The magazine of claim 8 wherein the tube comprises a transparent material.

10. The magazine of claim 8 wherein the jacking mechanism contacts the tube to form an airtight seal.

11. The magazine of claim 7 wherein the bottom cap has a cross section comprising a straight edge.

12. The magazine of claim 7 wherein:

the spindle has a cross section comprising a straight edge; and the jacking mechanism comprises a jacking plate with a hole in the center, wherein the hole in the jacking plate has a shape similar to the cross section of the spindle.

* * * * *